TELEPHONE SUBSCRIBER LINE CONCENTRATING SYSTEM

Filed July 21, 1966 10 Sheets-Sheet 1

INVENTOR
R. TORISU
BY Hall & Houghton
ATTORNEY

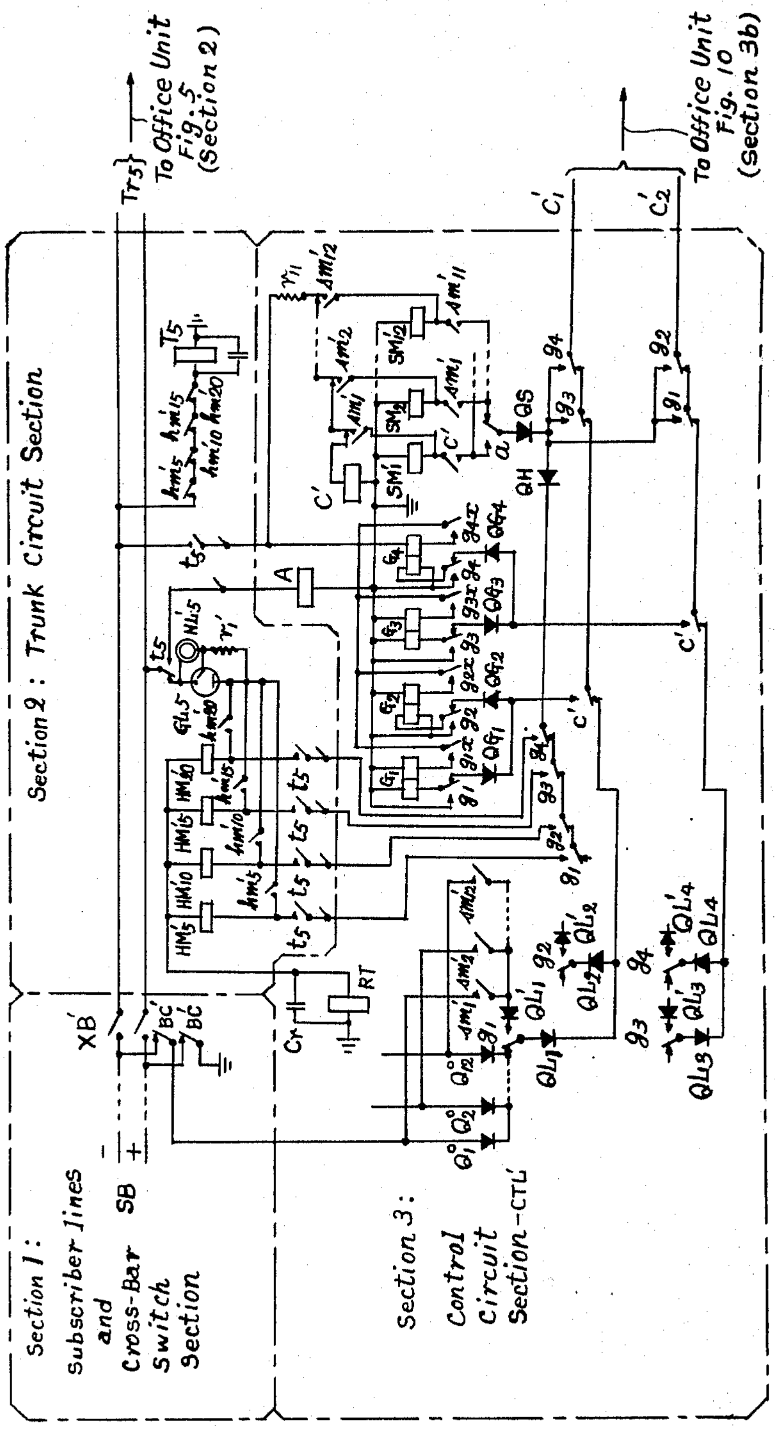
Fig. 2 (Remote Unit)
INVENTOR
R. TORISU
BY Hall & Houghton
ATTORNEY

June 18, 1968 RYOKICHI TORISU 3,389,229

TELEPHONE SUBSCRIBER LINE CONCENTRATING SYSTEM

Filed July 21, 1966 10 Sheets-Sheet 3

INVENTOR
R. TORISU

BY Hall & Houghton
ATTORNEY

Alternative Circuit for Office Unit
(Modification of Fig. 7)

INVENTOR
R. TORISU
BY Hall & Houghton
ATTORNEY

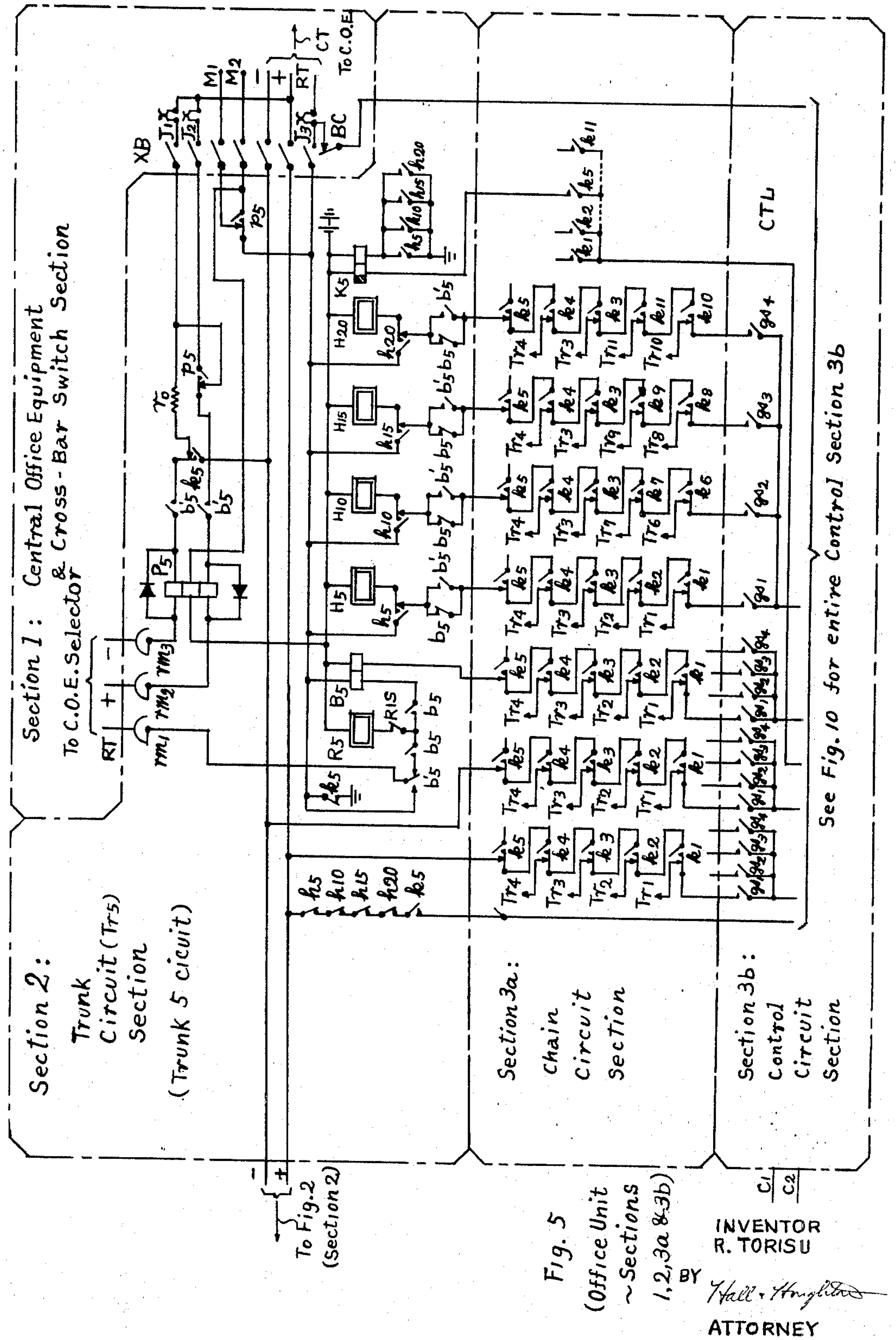
Fig. 5 (Office Unit ~ Sections 1,2,3a & 3b)
INVENTOR
R. TORISU
BY Hall & Houghton
ATTORNEY TELEPHONE SUBSCRIBER LINE CONCENTRATING SYSTEM
Filed July 21, 1966 10 Sheets-Sheet 6
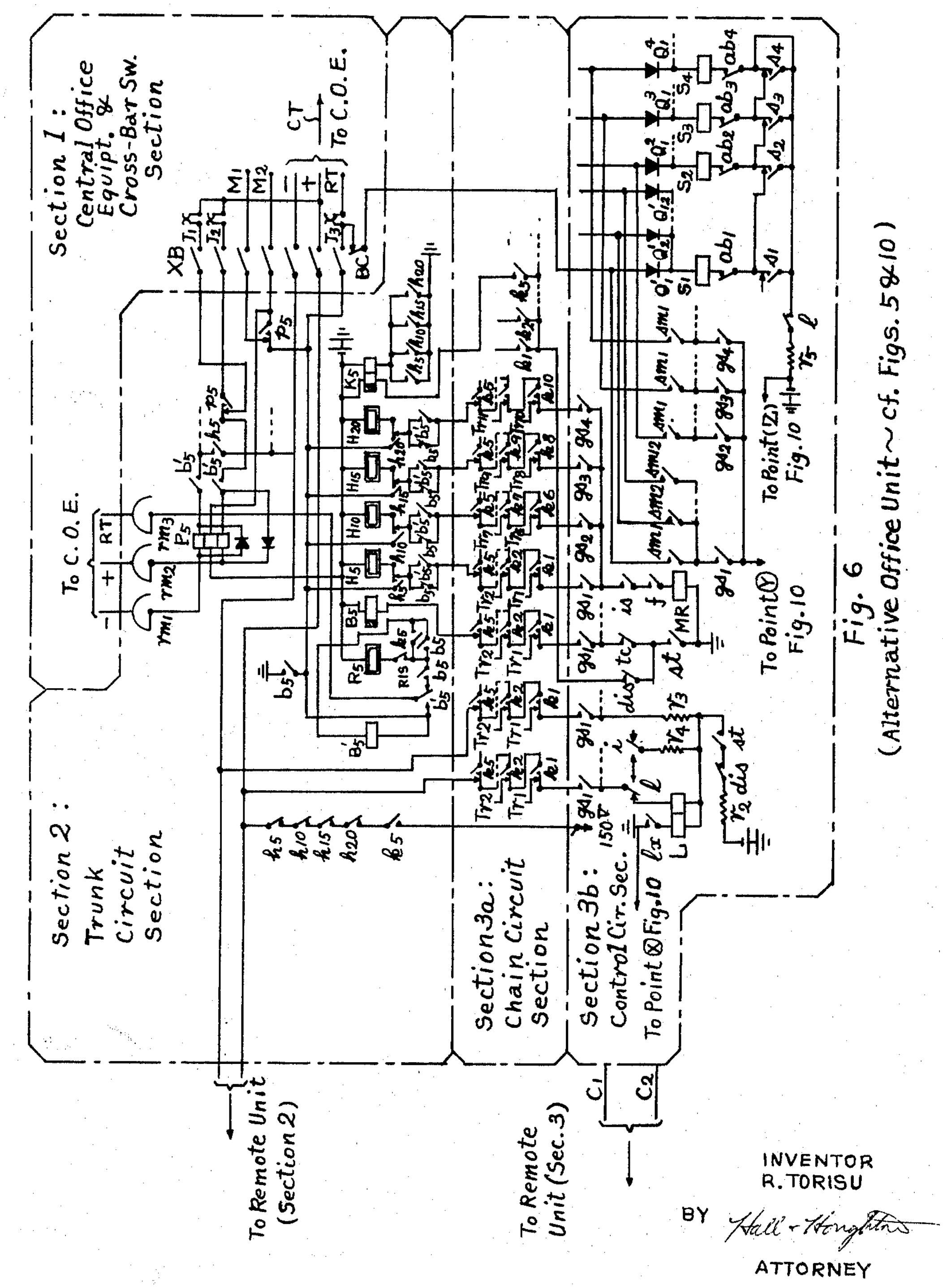
Fig. 6 (Alternative Office Unit ~ cf. Figs. 5 & 10)
INVENTOR
R. TORISU
BY Hall & Houghton
ATTORNEY (Alternative Circuit for Office Unit—Modification of Fig. 5)

INVENTOR
R. TORISU
BY Hall & Houghton
ATTORNEY

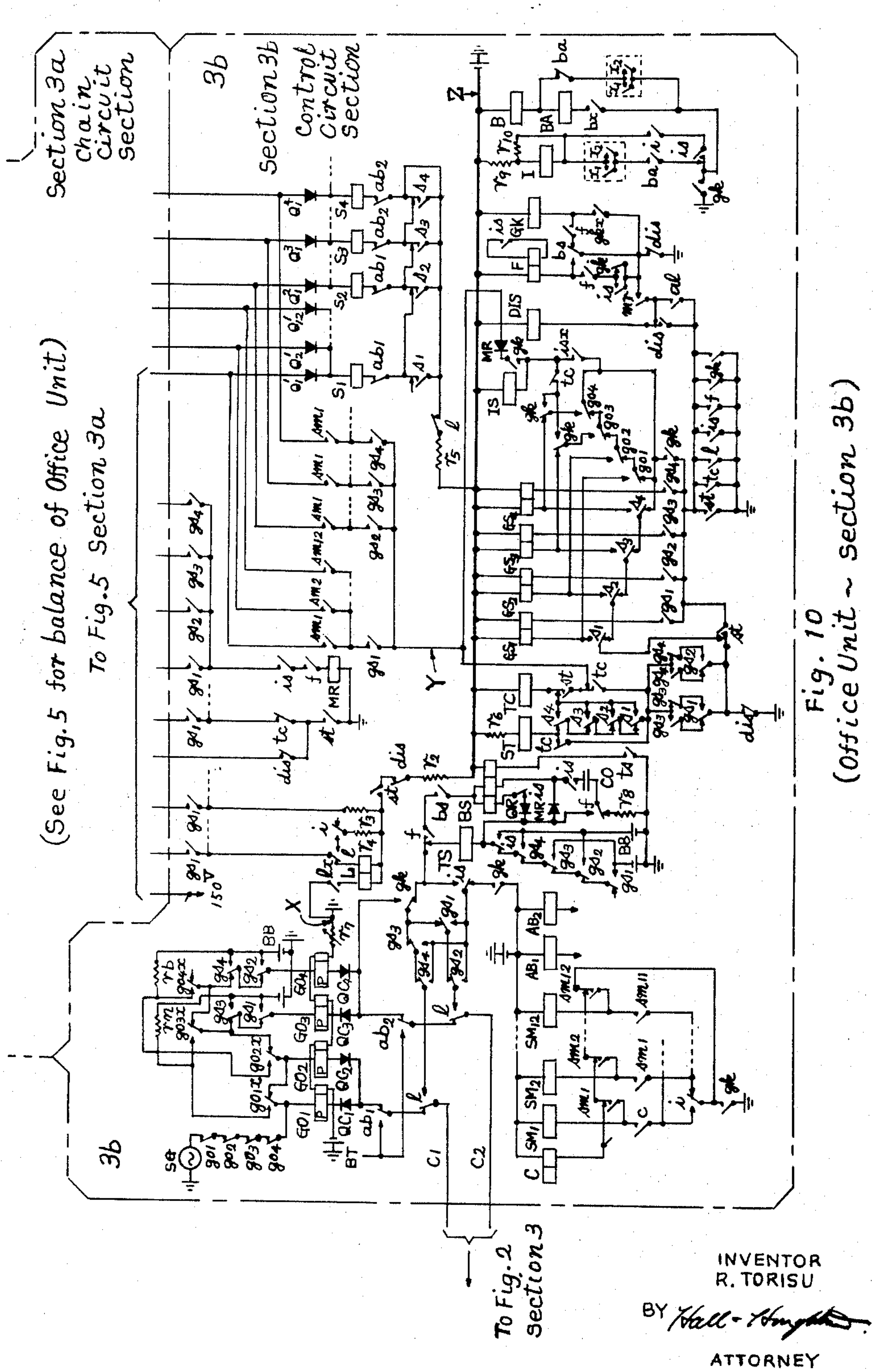
Fig. 10 (Office Unit ~ section 3b)
INVENTOR
R. TORISU
BY Hall-Hough
ATTORNEY

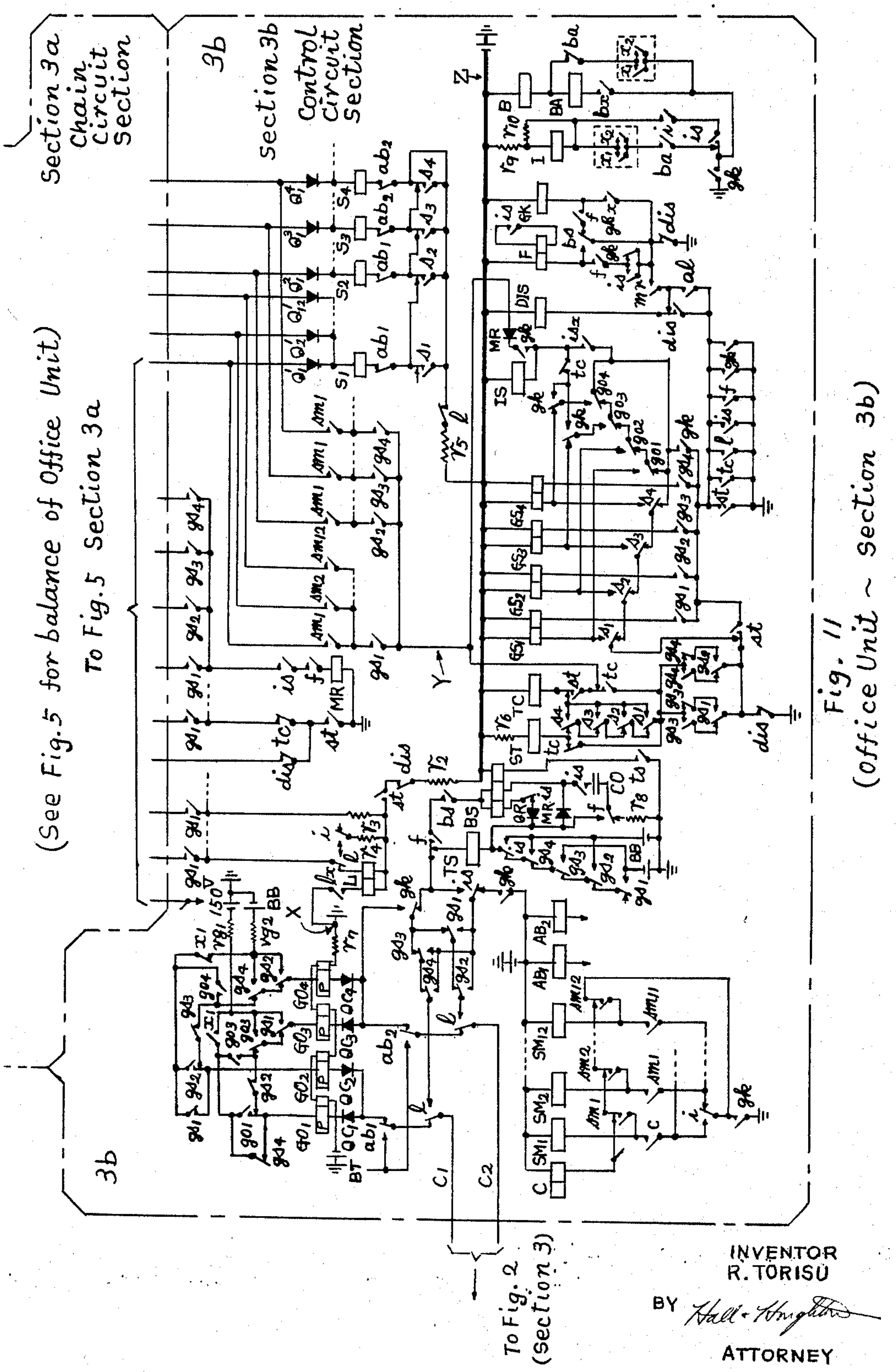
Fig. 11 (Office Unit ~ section 3b)
INVENTOR
R. TORISU
BY Hall & Houghton
ATTORNEY

TELEPHONE SUBSCRIBER LINE CONCENTRATING SYSTEM

Filed July 21, 1966 10 Sheets-Sheet 10

INVENTOR
R. TORISU
BY Hall & Houghton
ATTORNEY

1

3,389,229
TELEPHONE SUBSCRIBER LINE CONCENTRATING SYSTEM
Ryokichi Torisu, 1657 Mure, Mitaka-shi, Tokyo, Japan
Continuation-in-part of application Ser. No. 352,860, Mar. 18, 1964. This application July 21, 1966, Ser. No. 566,920
Claims priority, application Japan, July 5, 1963, 38/443
7 Claims. (Cl. 179—18)

ABSTRACT OF THE DISCLOSURE

A simplified line concentrator has trunk lines connected in accordance with a unique arrangement to corresponding vertical paths of special cross-bar switches at the central office and remote units, respectively. The horizontal paths of the remote switch are connected directly to a number of subscribers' lines larger than the number of trunks and those of the central office switch are correspondingly connected directly to subscribers' terminals of the automatic exchange. A control section at the remote switch is connected via a common control circuit to a like control section and a chain section at the central office switch for effecting connections through the trunks on demand, and for performing related functions. The chain circuit is made up of contacts of the trunk relays of the respective trunk circuits, and fixes the operating order of the trunk circuits. The unique connection of the lesser number of trunks to the vertical paths enables the number of trunk lines extending between the units to be varied as a function of subscriber traffic. The special cross-bar switches have at each crossing point not only a set of normally open contacts closed by operation of the switch to connect the subscriber lines and subscriber terminals to a trunk, but also have at each crossing point a set of normally closed contacts which are opened as the switch is so operated. The normally closed contacts associated with crossing points of the horizontal paths of a subscriber are themselves connected in series forming a demand signal circuit from ground through the subscriber's lines (or terminals) to the control circuit. When the connection of the horizontal paths to a trunk through the vertical paths is effected, enabling ground potential to be applied through the trunk from the calling subscriber's hook switch, the opening of the normally closed contacts at the crossing point releases the control circuit. The circuitry is simplified by the combination which also enables the trunks to be released promptly after their use by a calling party has been completed.

This application is a continuation-in-part of my copending now abandoned application Ser. No. 352,860 filed Mar. 18, 1964, the priority of which is claimed for all common subject matter.

The present invention relates to telephone systems, and, more particularly, to subscriber line concentrating systems.

Each subscriber station, or substation, normally requires a pair of wires to connect it with the central office. For a substation which is located at a distance from the central office, a large portion of the cost of installation and operation of the substation is that of the wire used in subscriber loop between the substation and the central office. The utilization of line concentrating systems is attractive, especially where the outside plant costs are high and the distances between groups of substations and the central office are large while the number of substations and the amount of local interconnecting traffic among the substations is not adequate to justify their connection to a separate community dial office.

2

As the central office is not directly in information communication with the subscriber lines, due to the interposition of the remote and central office units of the line concentrator, it is generally necessary in such systems to provide a number of control leads for testing and controlling the line concentrator. In order to obtain the greatest saving in telephone plant, it is desirable to have a high ratio between the subscriber and trunk lines connected to a remote line concentrator, while keeping the number of control leads required to pass information signals to and from the concentrator to a minimum.

It is a general object of the present invention to provide an improved communications system in which a large number of subscriber lines may be individually connected to a central office by a smaller number of common trunk lines, whereby considerable savings is attained.

Another object of the present invention is to provide a line concentrator system which effects economies in the wiring connecting central offices with subscriber's substations.

It is a further object of the present invention to provide a line concentrating system which is usable with all kinds of automatic telephone systems, including step-by-step systems, common control systems, and others.

Another feature of the present invention is that it allows considerable reduction in the conventional office equipment that would otherwise be required.

Various types of line concentrators are known, none of which, however, has the advantages of that of the present invention. Herein each cross bar switch for connecting individual subscriber lines to trunk lines is divided into several groups of contacts, each group including a plurality of horizontal paths to which subscriber lines are connected, and a plurality of vertical paths to some of which trunk lines are connected. Some of these vertical paths are connected individually to trunk lines (viz talking trunk lines) and the other vertical paths are led to several groups by connecting them with one another, and each group is connected to a trunk line. Therefore a number, less than all, of them are connected individually to the trunk lines. The operation whereby the number of vertical paths is reduced to the number of trunk lines is called "grading." The number of trunk lines (viz talking trunks) depends on the volume of subscriber traffic, and can be made larger or smaller, depending on the demand for the trunks. The feature of a variable number of talking trunks is a distinct advance over conventional concentrating systems, wherein the number of subscribers which can be accommodated and the number of trunks is fixed. Consequently, the line concentrator of the present invention can always be utilized to its full capacity, so that substantial savings can be realized. Moreover, the number of relays required by the present invention is few compared to the number required by prior art devices, and the cross-bar switch can be smaller than those previously used. In particular, the remote unit (which is the unit of the line concentrator located in the vicinity of the subscribers) requires but a single trunk relay for each trunk circuit, and only four to six relays for the common controlling device. Two to three relays are sufficient for each trunk circuit in the line concentrator unit located at the central office, and if the two-party line discriminating relay and the trunk hunting switch for the central office selectors are provided in the trunk circuit of the office unit, the central automatic exchange equipment does not require any more two-party line discriminating relays and can reduce the equipment of line relays, cut-off relays and line finders (or line switches) for the step by step system, and generally the main distributing frame may be made small, and its wiring is simplified.

The net result of these features is that since the cost of conventional automatic exchange equipment is almost equal to the combined cost of the automatic exchange equipment and the line concentrator, the cost savings resulting from use of the present system may be regarded as a net savings. Its operation is rapid, and precise, having almost no effect on the connecting operation of the automatic exchange. Moreover, the invention permits separate suspension of calls originating within the office regardless of the class of subscription of the caller, whether they are party-lines or individual lines. Thus, by using the line concentrator in suburban communities, the subscribers who are billed on the basis of toll rates can be accommodated by an exchange office located centrally of the suburban areas, to render exchange service as a separate independent office, so that marked economics in equipment and maintenance result. The inventor has given the name "Independent Exchange Offices Assembling System" to the new system by which several toll service areas' subscribers are simply assembled in a central office as several independent telephone exchange offices.

The line concentrator according to the present invention does not have any extraneous effect on the switching operation at a cross-bar type exchange, where a common control system is in use. To subscribers located at a comparative distance from the exchange, speaking and ringing currents may be supplied from the remote unit, and the dial impulse which occurs upon originating a call can be relayed by means of both wire impulses in the remote unit. Addition of various functions, such as discriminating between party and non-party lines, has increased the number of relays required in the trunk circuit only insubstantially, to three; one relay was required formerly. And for release, a release relay is used in place of a discharge tube; therefore, operation has been stabilized, with no major change in net price. Other associated circuits in the line concentrator are quite the same as in the case where the number of relays in the trunk circuit is reduced to one.

The above is the description of an application of this line concentrator to an automatic exchange, but it is also very convenient to generally use for the transmission of signals between specified points. Explanations with reference to diagrams will be given below.

FIG. 1 is a schematic diagram of a case where 11 trunks and a pair of control lines are used for 48 (96 lines in case of two-party line) individual lines accommodated by dividing a cross-bar switch into 4 parts.

FIG. 2 is a circuit diagram of the remote unit of a line concentrator employable in FIG. 1.

FIG. 5 shows the trunk circuit of the line concentrator which enables one to effectuate, within the office, separate suspension of originating calls regardless of the kind of subscriber concerned, i.e., whether an individual line subscriber or a party-line one.

FIG. 6 shows a variation of the trunk circuit shown in FIG. 5 and at the same time a part of the common controlling device directly concerned is shown as well.

FIG. 10 shows the common controlling circuit of the line concentrator on the exchange office side in the case wherein the calling subscriber accommodated in a cross-bar switch divided into 4 parts is identified by an AC power source with associated rectifiers.

FIG. 11 is the common controlling circuit of the case in which the (+) and (−) batteries are supplied alternately by means of the intermittent contacts in place of the AC power source shown in FIG. 10.

Figures 1, 15:
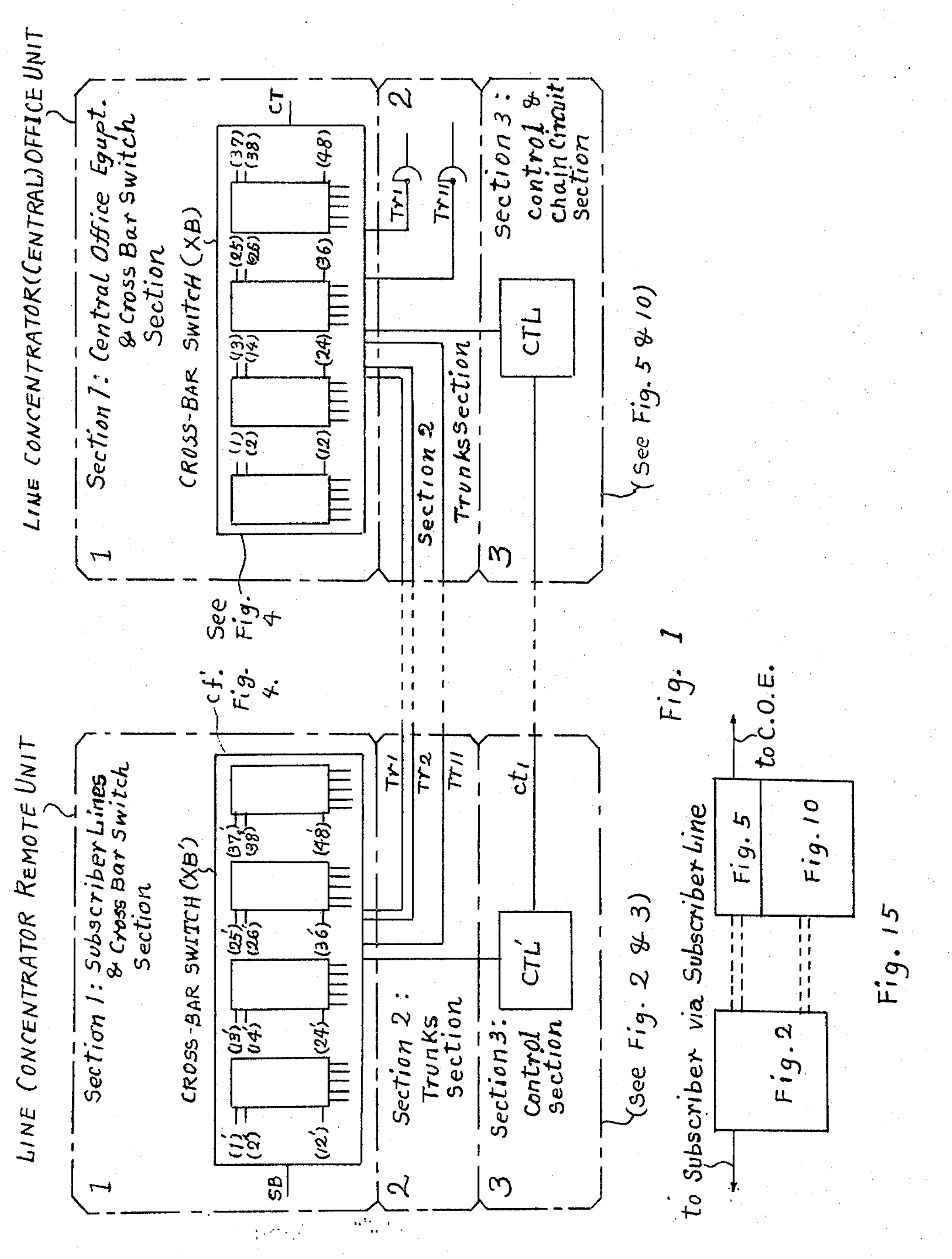
FIG. 15 illustrates the arrangement of FIGS. 2, 5 and 10 to constitute a line concentrator system according to FIG. 1.

Explanation of this invention making reference to the diagrams is given below. In order to facilitate an understanding of the invention, and how the several figures are related, the several sections of the line concentrator remote and central office units have been block outlined and identified by legends in the figures. Also in the drawings and description the convention is adhered to of designating relays with capitalized reference letters, and the contacts thereof with corresponding lower case letters, viz—relay $G_1$ with contacts $g_1$, relay A with contacts $a$, etc. Like relays for different subscribers are identified by like symbols with added numerals, e.g. $GO_1$, $GO_2$, $SM_1$, $SM_2$, etc. Finally, in order to facilitate location of the various relays, resistors and other elements to be referred to in tracing the operating circuits and avoid need to repeatedly refer to the location of such elements in the text, such locations are indexed in detail in Table A, following:

TABLE A.—LOCATION INDEX OF PRINCIPAL ELEMENTS OF DRAWINGS

| Reference Letters | Element Name | Figures 1 | 2 | 3 | 5 | 6 | 7 | 8 | 9 | 10 | 11 | 12 | 13 | 14 |
|---|---|---|---|---|---|---|---|---|---|---|---|---|---|---|
| A | Relay, impulse | | C | C | | | | | | | | | | |
| AB | Relays | | | | | | | | | BL | BL | | | |
| B | ----do | | | | | | | | | ER | ER | | | |
| BA | ----do | | | | | | | | | ER | ER | | | |
| BB | Booster Battery | | | | | | | | | B&TL | B&TL | | | |
| BC | A series of Cross Break Contacts of XB. | | | | TR | TR | TR | TR | TR | | | | | |
| BC′ | A series of Cross Break Contacts of XB′. | | TL | TL | | | | | | | | | | |
| RL | Relay, release | | | C | | | | | | | | | | |
| BS | Relay, group assigning | | | | | | | | | LC | LC | | | |
| B | Relay | | | | C | C | BL | CL | BL | | | | | |
| B′ | ----do | | | | | CL | BL | | | | | | | |
| B″ | Relay, auxiliary | | | TR | | | | | | | | | | |
| C | Relay | | | | | | | | | BL | BL | | | |
| C′ | Relay, start | | C | C | | | | | | | | | | |
| Cb/Cb′ | Condenser | | | TC | | | | | | | | | | |
| Cr | ----do | | LC | | | | | | | | | | | |
| DIS | Relay | | | | | | | | | BR | BR | | | |
| F | ----do | | | | | | | | | BR | BR | | | |
| G | Relays, group | | C | C | | | | | | | | | | |
| G | Discharge Tube | | TC | | | | | | | | | | | |

| Reference Letters | Element Name | Figures 1 | 2 | 3 | 5 | 6 | 7 | 8 | 9 | 10 | 11 | 12 | 13 | 14 |
|---|---|---|---|---|---|---|---|---|---|---|---|---|---|---|
| GK | Relay | | | | | | | | | BR | BR | | | |
| GO | Relays, originating group | | | | | | | | | TL | TL | | | |
| GS | Relays, group assigning | | | | | | | | | C | C | | | |
| H | Holding Magnets (XB Sw) | | | | C | C | B | C | B | | | | | |
| HM' | Holding Magnets (XB' Sw) | | TL | TL | | | | | | | | | | |
| I | Relay | | | | | | | | | BR | BR | | | |
| IS | do | | | | | | | | | RC | RC | | | |
| K | Relays, trunk | | | | CR | CR | BR | CR | BR | | | | | |
| L | Relay, line | | | | | BL | | | | CL | CL | | | |
| MR | Relay | | | | | BC | | | | C | C | | | |
| NL | Neon Lamp | | TC | | | | | | | | | | | |
| P | Relays, discriminating | | | | TC | TC | TC | TC | TC | | | CL | C | |
| P' | do | | | TC | | | | | | | | | | |
| Qo | Rectifiers | | L | L | | | | | | | | | | |
| Q | do | | | | | BR | | | | TR | TR | | | |
| QC | do | | | | | | | | | TL | | | | |
| QG | do | | CB | CB | | | | | | | | | | |
| QH | do | | R | R | | | | | | | | | | |
| QL | do | | L | L | | | | | | | | | | |
| QP | do | | | CT | | | | | | | | | | |
| QS | do | | R | R | | | | | | | | | | |
| QT | do | | | C | | | | | | | | | | |
| ro | Resistor | | | | T | | | T | | | | | | |
| rb | do | | | | | | | | | TL | | | | |
| rg1 | do | | | | | | | | | | TL | | | |
| rg2 | do | | | | | | | | | | TL | | | |
| rn | do | | | | | | | | | TL | | | | |
| r'o | do | | | TC | | | | | | | | | | |
| r'1 | do | | | C | | | | | | | | | | |
| r'2 | do | | | TC | | | | | | | | | | |
| r2 | do | | | | | BL | | BL | | LC | LC | | | |
| r3 | do | | | | | BL | | BL | | LC | LC | | | |
| r4 | do | | | | | BL | | BL | | LC | LC | | | |
| r5 | do | | | | | EB | | EB | | C | C | | | |
| r6 | do | | | | | | | | | C | C | | | |
| r7 | do | | | | | | | | | TL | TL | | | |
| r8 | do | | | | | | | | | BL | BL | | | |
| r9 | do | | | | | | | | | BR | BR | | | |
| r10 | do | | | | | | | | | BR | BR | | | |
| r11 | do | | ER | ER | | | | | | | | | | |
| RIS | Self-intermittent Contact (See R5) | | | | | | | | | | | | | |
| RT | Relay | | L | | | | | | | | | | | |
| R | Rotary Magnet | | | | LC | LC | | LC | | | | | | |
| S | Relays, terminating group | | | | | BR | | | | TR | TR | | | |
| SB | Subscriber Line | TL | TL | TL | | | | | | | | | | |
| SM | Selecting Magnets (XB Sw) | | | | | | | | | BL | BL | | | |
| SM' | Selecting Magnets (XB' Sw) | | R | R | | | | | | | | | | |
| ST | Relay, Start | | | | | | | | | C | C | | | |
| T | Relay, trunk | | TR | | | | | | | | | | | |
| T' | do | | | TC | | | | | | | | | | |
| TC | Relay, termination indicator | | | | | | | | | C | C | | | |
| TS | Relay | | | | | | | | | LC | LC | | | |
| RT | Retardation Coil | | EL | | | | | | | | | | | |
| V | Relay | | | | | | | | | | | | | BL |
| XB | Cross Bar switch (office unit) | TR | | | TR | TR | TR | TR | TR | | | | (All) | |
| XB' | Cross Bar switch (remote unit) | TL | TL | TL | | | | | | | | | | |

E=extreme. L=left. R=right. C=center. T=top. B=bottom.

Figure 4:
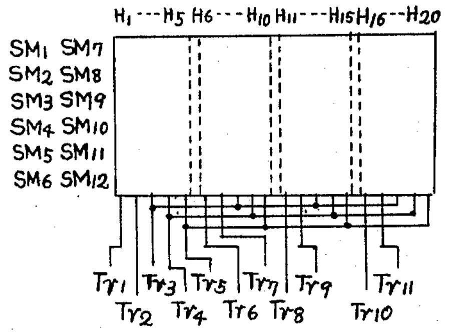
FIG. 4 shows the grading providing 11 trunks by dividing a cross-bar switch into 4 parts.

To facilitate an understanding of important parts of the illustrated embodiments hereinafter described in detail, it should be initially appreciated that in the present invention a special cross-bar switch is employed at the remote unit and a similar special cross-bar switch is employed at the office unit. The cross-bar switch XB' at the remote unit (XB at the office unit) is divided into a number of parts, each of which comprises a plurality of horizontal paths and a plurality of vertical paths, interconnectable at the crossing points by normally open contacts (XB', FIG. 2, Section 1; XB, FIG. 5, Section 1). Subscribers' lines SB are directly connected to the horizontal paths in the remote unit, i.e. without the interposition of line and cut-off relays, and subscriber's terminals CT are directly connected to the horizontal paths in the office unit, i.e. without the interposition of any sleeve and cut-off relays. The vertical paths are in part interconnected (as illustrated in FIG. 4) to form a number of vertical path sets less than the number of vertical paths. These vertical path sets correspond in number to a number of trunks through which they are connected from the remote unit to the central office unit, which number of trunks is less than the number of subscriber's lines. The cross-bar switch at each unit also includes a separate set of contacts (FIG. 2, Section 1, BC', BC''; FIG. 5, Section 1, BC) at each crossing point which are normally closed. When the cross-bar switch is operated to close the contacts XB' or XB between the horizontal and vertical paths at any given crossing point, the normally closed set of contacts BC' or BC at that crossing point is opened. The sets of normally closed contacts BC' or BC at the respective crossing points of each horizontal path are connected in series. Thus when the cross-bar switch is operated to close the make contacts to connect a horizontal path to one of the five vertical paths of the switch division, such operation opens the break contacts through which ground was applied to the control circuit while the subscriber's line was demanding connection to a concentrator trunk, thus freeing the control circuit for use by other calls, and the maintenance of this open circuit until the cross-bar switch connection is released enables the seized trunk to be released as soon as the call is finished and the controlling handset is hung up. Turning now to the specific embodiments shown in the drawings, and referring first to the general diagram, FIG. 1, the line concentrator employs on each side (that is, the subscriber side and the central office side) one cross-bar switch which is divided into 4 units; 12 subscriber lines SB are accommodated in each divided unit, then 48 subscriber lines SB are accommodated in one cross-bar switch, and 5 vertical paths are led out for every divided group, and the 5 vertical paths per group totalling 20 vertical paths, are concentrated to 11 trunks $Tr_5$ due to the grading conducted among the divided groups. On the exchange office side each trunk is connected to the selectors of the automatic exchange via a rotary switch, and also is connected to the connector bank via subscriber line terminal CT of the same. The common controlling device CTL′ of the remote unit of a line concentrator and that CTL of the office unit of the one are connected by a pair of control lines $Ct_1$.

FIG. 4 shows the diagram of the switching mechanism and the composition of the trunks, and is an example in which one cross-bar switch is divided into 4 parts, and after conducting grading 11 trunks are provided. The number of trunks is variable at will to 8, 9 . . . 11 or 12, etc. depending on the call volume. The cross-bar switch in this example is assumed to have selecting magnets $SM_1$ to $SM_{12}$, and holding magnets $H_1$ to $H_{20}$; therefore, 12 subscriber lines (24 subscribers, in case of 2-party lines) per divided unit, for a total of 48 subscriber lines (96 subscribers, in case of 2-party lines) and 11 trunks are used.

FIG. 5 shows the trunk circuit of the fifth trunk ($Tr_5$) of the trunks (from $Tr_1$ to $Tr_{11}$) as shown in FIG. 4. This invention is so designed that one cross-bar switch is divided, in the manner described above, into several units; each divided unit accommodates a separate group of subscriber lines; determines the trunk utilization order; conducts grading among the vertical paths used by each group; varies the composition of grading depending on the call volume of subscriber lines to effectively determine the number of trunks required; always only one holding magnet carries out operation. This is one of the excellent features unobservable in conventional line concentrators. Because the utilization order of trunks Tr is determined by one trunk relay K provided in the trunk circuit on the exchange office side, the process of determination of the trunk utilization order is simple, and the operation is quick and efficient. Besides this, the trunk circuit in the exchange office side is provided an originating call discriminating relay P, a rotary switch (its magnet R) which saves some parts of an automatic exchange equipment having different originating call and terminating call routes, and a magnet R which drives the rotary switch. In the trunk circuit on the outside office side, e.g. FIG. 2, only one trunk relay T is contained, and besides this only a single discharge tube GL is provided, and even in the case where the speaking current has to be supplied locally due to long distance as in FIG. 3, only trunk relay T′, auxiliary relay B″, two-party line discriminating relay P′, and release relay RL are provided as shown. As to the common control circuit it contains only impulse relay A, FIG. 2, start relay C′ and individual-group relays $G_1$ to $G_4$ representing much simplification in composition of the equipment. As a result an insertion of only one trunk relay T (or several relays for FIG. 3) in the outside trunk circuit enables to increase one trunk circuit, and in the exchange office the number of trunks can be increased in the like manner.

In FIG. 1 one cross-bar switch has been divided into 4 groups; each group accommodates 12 subscriber lines or line terminals; each group is provided with 5 vertical paths totalling 20; these trunks are, by grading concentrates to 11 trunks ($Tr_1$–$Tr_{11}$) to which common controlling device CTL′ and CTL are provided; a pair of control lines $Ct_1$ connects CTL′ and CTL, and if necessary, a rotary switch which connects the line concentrator to the automatic exchange efficiently may be inserted into each trunk.

DETAILED CIRCUIT DESCRIPTION (1) *Originating call (i.e. subscriber's call via remote unit)*.—Briefly: As is hereinafter explained in more detail, in originating a call via the remote unit, lifting of the hand set of the subscriber's telephone set closes the hook switch of the telephone set, thus grounding one of the two control lines ($C'_1$ and $C'_2$ in FIG. 2 viz $C_1$ and $C_2$ in FIG. 10) via the series of the cross break contacts BC′ of the horizontal path in the cross-bar switch XB′. A circuit is thus completed which energizes the originating group relay ($GO_1$, FIG. 10) which in turn operates a group assigning relay $GS_1$, FIG. 10 which determines priority. Operation of $GS_1$ operates office unit start relay ST in FIG. 10, which actuates two step relay B5 (FIG. 5) to its first step position causing wipers $rm_1$ to $rm_3$ (FIG. 5) to rotate to an idle selector of the automatic exchange. Completion of this operation causes the two step relay B5 (FIG. 5) to take its second step, which seizes the automatic exchange equipment and grounds the RT wire. The sequence of operations then causes the selecting magnets $SM_1$ to $SM_{12}$ of the cross-bar switch at the office unit (FIG. 4), and the corresponding selecting magnets $SM'_1$ to $SM'_{12}$ of the cross-bar switch at the remote unit to shift under the influence of an impulse relay I until the cross-bar switch selecting magnet ($SM'_1$) associated with the calling subscriber is operated. This condition initiates operations which energize the holding magnets associated with the vertical paths through the cross-bar switches to which the available trunk is connected. The subscriber at the remote unit is thus connected to the control office equipment via the cross-bar switches and trunk lines of the line concentrator and may proceed to dial his call in response to the dial tone. Having affected the trunk connection of the remote subscriber to the central office equipment and arranged for holding of that connection until released by the calling subscriber, the control circuit equipment of the line concentrator is released. In more detail: Circuit operation is described referring to FIGS. 2, 5 and 10. FIG. 2 shows a subscriber line of the first group and trunk circuit $Tr_5$. When a subscriber of this subscriber line SB lifts his handset from his telephone set, the control line $C'_1$ is grounded through the subscriber's loop and the series of the cross break contacts BC′ of X′B, then relay $GO_1$ at upper left of FIG. 10 operates by the route of SG (AC power source-commercial frequency is usable with rectifiers QC)–$go_1$–$go_2$–$go_3$–$go_4$–$GO_1$ (originating group relay)–$QC_1$–$ab_1$–$l$–$C_1$ . . . (FIG. 2) $C'_1$–$g_4$–$g_3$–$c'$–$QL_1$–$g_1$–$Qo_1$–BC′–(−) wire . . . SB– subscriber –SB . . . (+) wire –BC′–ground, and sets up its holding circuit by the route of battery–$rn$–$go_1x$–$GO_1$–$QC_1$–$ab_1$–$l$–$C_1$ . . . BC′–ground (FIG. 2) as shown in the relay $GO_1$ operating route, and SG is cut off. At this time if a subscriber in the third group is lifting his handset, it may happen that the group relay $GO_3$ (upper left of FIG. 10) goes into operation simultaneously. However, referring to the center of FIG. 10, $GS_1$ (group assigning relay) operates by the route of battery–$GS_1$–$go_1$–$go_2$–$go_3$–$go_4$–$s_4$–$s_3$–$s_2$–$s_1$–$st$–$dis$–ground. The design is such that as to group relays the priority order goes from $GO_1$ to $GO_4$ and in case of group assigning relays the priority order goes from $GS_4$ to $GS_1$ and always only one group assigning relay will operate. By the operation of $GS_1$ the start relay ST at left of center of FIG. 10, operates (via circuit from battery at extreme right of FIG. 10, $r_6$, ST, $s_4$, $s_3$, $s_2$, $s_1$, $gs_3$, $gs_1$, *dis*, to ground) to set up the holding circuit of $GS_1$ (from $GS_1$ via $gs_1$, *st*, *dis* to ground). In the case where $K_1$ to $K_4$ are operating, trunk relay $T_5$ shown in FIG. 2 operates via the (−) wire of trunk circuit of the trunk $Tr_5$ shown in FIG. 5 to cause start relay C′ to operate due to the operation of ST. Although relay L shown in FIG. 10 sets up an operating circuit in series with relay A via the (+) wire of the trunk circuit shown in FIG. 2, contact $x$ is the quickest to make and assists the completing operation of L and the circuit of A is opened, therefore, A will not operate. In FIG. 5 when ST operates two-step operation relay $B_5$ makes the first-step operation to close contact $b_5$, therefore, rotary magnet $R_5$ assisted by self intermittent contact RIS causes wipers $rm_1$ to $rm_3$ of the rotary switch to rotate until they come on to an idle selector of the automatic exchange. When an idle selector is selected current flows through another winding of $B_5$, therefore, $B_5$ makes, at once, the second step operation to close contact $b_5'$. By this means the automatic exchange side is immediately made busy and simultaneously a loop for (−) and (+) wires of the automatic exchange is set up, and also ground is sent to RT wire from the automatic exchange side. (However, the case shown in FIG. 6 is, as will be described later, somewhat different, but as shown in FIG. 6 two relays $B_5$ and $B'_5$ are usable instead of relay $B_5$ ) By the operation of L, the holding routes of group relays are disconnected, therefore, $GO_1$ releases. Relay TS operates by the circuit of battery–$gs_1$–$gs_2$–$gs_3$–$gs_4$–*is*–TS–*f*–*gk*–$gs_3$–$gs_4$–*l*–C . . . $C'_1$–$g_4$–$g_3$–*c'*–$QG_1$–$g_1$–$G_1$–ground. Still referring to FIGS. 2 and 10, individual-group relay $G_1$ does not operate because of the high resistance winding of TS, but relay BS operates (battery–BS–*ts*–ground) and relay F operates to set up its own self-holding circuit. $G_1$ operates by the circuit of battery–$gs_1$–$gs_2$–$gs_3$–$gs_4$–*is*–QR–*is*–BS–*bs*–*f*–*gk* . . . $C_1$ . . . $C'_1$ . . . $G_1$–ground; BS is held and TS releases. The holding circuit of $G_1$ is set up by the route of battery–$r_2$–*dis*–*st*–$r_3$–$gs_1$–$k_1$ . . . $k_5$–(−) wire . . . (−) wire–$t_5g_1x$–$G_1$–ground. By the operation of $G_1$ BS releases because its holding circuit is opened; relay GK operates to set up self-holding circuit, and F releases. By the operation of GK relay B operates through the operation of the intermittent contact $x_1$ or $x_2$ (a standby to be used alternately with $x_1$) provided from other circuitry, and when the intermittent contact $x_1$ opens relay BA operates and relay I makes intermittent operation perfectly in accordance with make-break of the intermittent contact $x_1$. By the operation of GK relay C is put into operation, therefore, the order selecting magnets $SM_1$ to $SM_{12}$ will shift from $SM_1$ to $SM_{12}$ according to the intermittent operation of impulse relay I; relay A also undergoes intermittent operation in accordance with relay I by the route of battery–$r_2$–*dis*–*st*–$r_4$–*i*–*l*–$gs_1$–$k_1$ . . . $k_5$–(+) wire . . . (+) wire–$t_5$–A–ground, and selecting magnet $SM'_1$ operates by the route of battery–*gk*–*is*–$gs_1$–$gs_2$–*l*–$C_2$ . . . $C'_2$–$g_2$–$g_1$–QS–*a*–*c'*–$SM'_1$–ground and $SM'_1$ is held by the route of battery–$r_2$–*dis*–*st*–$r_3$ . . . $t_5$–$r_{22}$ . . . $Sm_2$–$SM'_1$–ground. Thus the order selecting magnets $SM'_1$ to $SM'_{12}$ also shift from $SM'_1$ to $SM'_{12}$. When C' is released by the operation of $SM'_1$, the first-step of shift, and hunts for the calling subscriber by the route of battery–$gs_1$–$GO_3$–$QC_3$–*gk*–$gs_3$–$gs_4$–*l*–$C_1$ . . . $C'_1$–$g_4$–$g_3$–*c'*–$QL_1$–$g_1$–$QL'_1$–$SM'_1$–BC' . . . SB–calling subscriber–SB . . . BC'–ground. Then $GO_3$ will operate. By the way of battery–IS–*tc*–*gk*–$go_3$–$go_4$–*gk*–*st*–*dis*–ground, impulse stop relay IS operates to set up self-holding circuit immediately. I is held at the position of operation or non-operation, and the shift of selecting magnets stops simultaneously both inside and outside of the office. Relay TS operates by the way of (+) battery–*is*–TS–*f*–*is*–$gs_1$–$gs_2$–*l*–$C_2$ . . . $C'_2$–$g_2$–$g_1$–QH–$g_4$–$g_3$–$g_2$–$g_1$–$t_5$–$HM'_5$–RT–ground; BS operates; F operates to set up its self-holding circuit; holding magnet $HM'_5$ operates and is held by its residual magnetism, because condenser CO has been charged by (+) battery BB at the time of the operation of IS, therefore, two fold voltage is applied to holding magnet $HM'_5$ by the route of MR (bridging from the first ● to the second ●)
(+)battery–*is*–●–*f*–CO–*is*–●–BS–*bs*–*f*–*is*–$gs_1$–$gs_2$–*l*–$C_2$ . . . $C'_2$ . . . $HM'_5$–RT–ground TS releases by the operation of F, $T_5$ releases by the operation of $HM'_5$ and BS releases by the restoration of $T_5$. Holding magnet $H_5$ operates by the route of battery–$H_5$–$h_5$–$b'_5$–$k_5$ . . . $k_1$–$gs_1$–*is*–*f*–MR–ground and becomes self-holding via RT wire. Marginal relay MR operates simultaneously with $H_5$ to operate release relay DIS and DIS sets up the self-holding circuit, but it will release when all the relays in operation release, and will be able to cater to the next call. Still referring to FIG. 5, by the operation of $H_5$ trunk relay $K_5$ operates to free trunk $Tr_5$ from the common controlling device. CTL. If it so happens that holding magnet $H_5$ releases while the common controlling device in the office side is operating because of another call, though the remote unit will release, but to prevent misconnections $K_5$ remains held as it has another holding circuit of battery–$K_5$–$k_5$–*dis*–*st*–ground so as not to release until the common controlling device being used releases after completing the connecting operation. In other words, if the common controlling device on the exchange office side is operating although the trunk being used will release but the trunk relay K will not release. And it is so arranged that unless the rotary switch has selected an idle line, contact $b'_5$, will not make and the holding magnet will not operate. In the case of FIG. 6 when rotary magnet $R_5$ hunts for an idle line, relay $B'_5$ operates to hold the idle line as a busy line because the RT wire of this idle line has ground via contact $b_5$, and the subscriber loop for the automatic exchange will be completed after the operation of $H_5$, ground also comes to RT wire from the automatic exchange side, and when the circuit of slow release relay $B_5$ is opened by the operation of $K_5$, ground on the RT wire which has been given by the contact $b_5$ will be lost by its release. The (−) wire that goes to the selector in the automatic exchange does not pass through the crossbar switch cross contact XB, but the (+) wire passes through the subscriber line terminal side of XB and the line terminal side is divided, for a two-party line, into two of which one passes through jack $J_1$, and the other through jack $J_2$ enabling to separately suspend originating call from a party line. By making RT wire busy by jack $J_3$ the reason for suspension of call can be explained by means of a tape recorder, therefore, this is very convenient. It is very simple to arrange so as to earth one wire or both of a subscriber line at the beginning of rotation and at the end of release, or conversely at the end of rotation and at the beginning of release of a subscriber's dial, and if such a dial as described above is provided for one party of a two-party line, by such dial relay P, being of differential winding type, operates through its one winding to hold with the holding winding. By this means RT wire is connected to subscriber fee meter $M_1$ or $M_2$, FIG. 5, providing for separate registration of a two-party subscriber and aforesaid separate suspension of originating call as well. In this FIG. 5 the (+) wire has been extended through the line terminal side, but it is also possible to extend the (−) wire through the line terminal side. The rectifiers inserted parallel to the differential windings prevent relay P from operating even if one party of a two-party line should dial a call while his co-subscriber is speaking to another subscriber. Explanation has been made of a two-party line, but the same principle is applicable to party-lines in general.

(2) *Releases* (*i.e. by the subscriber hanging up his handset*.—When the calling subscriber hangs up his handset, ground on RT wire of the automatic exchange is lost; relay $B_5$ ($B'_5$ at FIG. 6) and holding magnet $H_5$ release; then 150 v. is sent to (+) wire till slow release trunk relay $K_5$ is released by the restoration of holding magnet $H_5$ and lighting neon lamp $NL'_5$ stabilizes discharge of discharge tube $GL_5$. Residual magnetism of $HM'_5$ is neutralized by discharge current of $GL_5$ to make it release. But the holding circuit of the trunk relay $K_5$, which is usually released by the restoration of the holding magnet $H_5$, is released by the operation of disconnecting relay DIS of the common controlling device which means that $K_5$ is not released by $H_5$ to save a subscriber from mis-connection while the common controlling device is working for the one.

(3) *Terminating call* (*i.e. connecting to a subscriber via a remote unit*).—Briefly, a call reaching to a subscriber via the line concentrator from the automatic exchange equipment, is connected through the line concentrator in a quite similar manner as well as in the originating call, except that terminating group relays S initiate the operation, instead of the originating group relays GO, group assigning relays GS determining the group, and except that the terminating call has priority in the line concentrator over an originating call.

In more detail when line terminal CT of the line concentrator is caught, as in the case shown in FIG. 6 (Section 3*b* of which includes portion of FIG. 10), terminating group relay $S_1$ out of $S_1$ to $S_4$ is put into operation by the route of ┌——$S_1$——┐
battery–$r_5l$–⊛–$S_4$–$S_3$–$S_2$–⊛–$ab_1$–$S_1$–$Q'_1$–BC–$J_3$–RT . . . ground Priority order among $S_1$ to $S_4$ goes from $S_1$ to $S_4$ and is reversal of that of group assigning relay $BS_1$ to $BS_4$. When $S_4$ operates first, others do not operate so that only $BS_4$ operates, but in the case where $S_1$ operates, $S_2$ operates, $S_3$ operates and $S_4$ operates, that is, even if all of $S_1$ to $S_4$ happen to be put into operation, it is so arranged that only $GS_1$ out of $GS_1$ to $GS_4$ will operate. In other words, only one group assigning relay will operate (just as in the case of originating calls), and between originating and terminating calls the latter have priority. This is due to the fact that in case of terminating calls the connecting operation of the automatic exchange has already been completed. In the case of FIG. 10 when $S_1$ operates $BS_1$ operates; terminating indicating relay TC operates to open the operating circuit of $B_5$, and ST operates to set up the holding circuits of TC and BS. In either case of originating or terminating calls this controlling device will not get into a smooth running order until operation of the office unit start relay ST. Operation thereafter is quite the same as in the case of originating calls, therefore, explanation has been omitted. However, the only difference is that even if $GO_3$ or $GO_4$ should operate for an originating call from a subscriber, relay IS would make no operation if the terminating operation is in progress but would operate by the route of battery–IS–*gk*–$MR_1$–$gs_1$–$sm_1$–BC–$J_3$–RT . . . ground. Note-worthy is the fact that assuming $GO_1$ is operated by the calling subscriber to start the common controlling device, and the connecting operation is in progress, but before the operation of IS the terminating group relays are started, and among the terminating group relays there is a terminating group relay which indicates the same group as the group assigning relay operated by the calling subscriber, and the called subscriber is controlled by contact $sm_1$ and the calling subscriber is controlled by contact $sm_2$; in such a case because a terminating call has priority in the Order Selective Circuit ($SM_1$ to $SM_{12}$ or $SM'_1$ to $SM'_{12}$), therefore, TC and IS will operate as described below to set up connection for the terminating call enhancing the efficiency of the automatic exchange; and even if the calling subscriber happens to be controlled by the same contact $sm_1$ as the called subscriber, the operation of the Order Selective Circuit on the outside office side is delayed as long as the interval required for relaying of the intermittent operation of I by A more than the operation of the Order Selective Circuit on the exchange office side driven directly by make-break of I is, and if the selector has not been caught, IS and TC operate simultaneously by the route of ┌TC—*st*—*tc*┐
battery–⊛–IS–*gk*–$MR_1$–⊛–$gs_1$–$sm_1$–BC–$J_3$–RT . . . ground to release $B_5$, and the holding magnet operates to connect the terminating call with priority without sending out a call signal. In this instance if the selector has already been caught a terminating connection is set up holding the originating route of the line concentrator as it is, and the calling subscriber via the remote unit of the line concentrator can answer to the call coming from the office unit of the one after deadening the dial tone by dialling once, or the originating subscriber via the remote unit being called by the terminating connection can hang up his handset, or the calling subscriber can continue the connecting operation to his desired subscriber without taking any other step for the terminating call.

Figure 7:
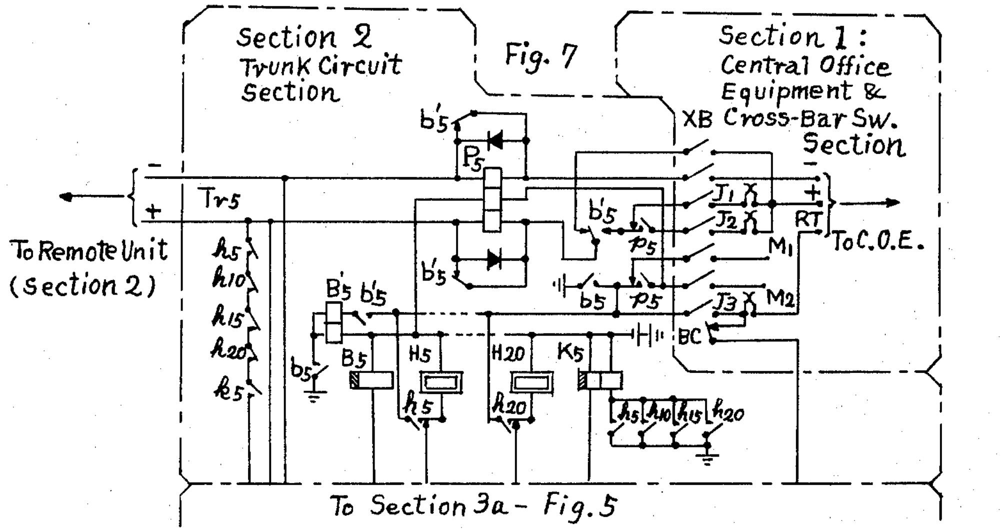
FIG. 7 shows the trunk circuit of the line concentrator on the exchange office side in the case wherein the automatic exchange system uses the same route for originating and terminating calls.
Figure 9:
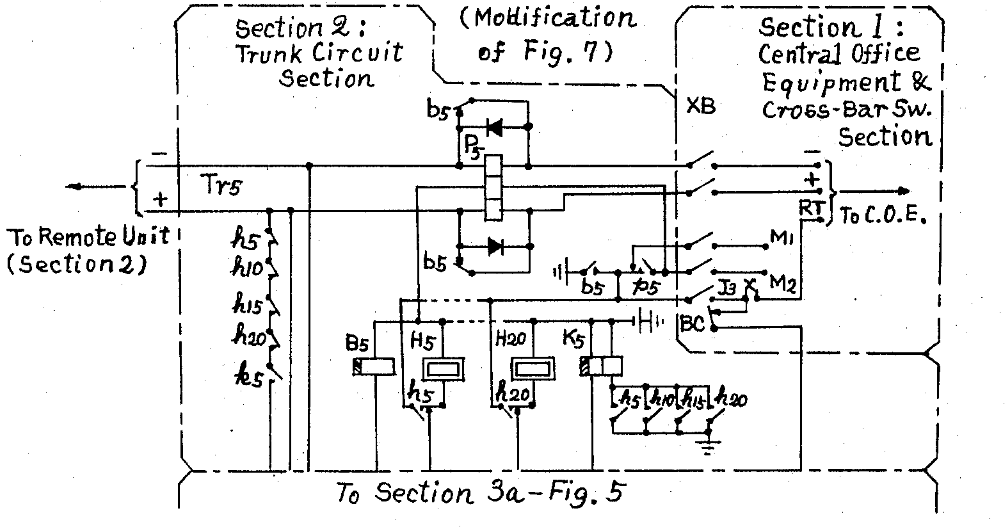
FIGS. 8 and 9 shows the trunk circuit on the exchange office side. The diagrams have been obtained by excluding the separate originating call suspending function from those shown in FIGS. 5 and 7 respectively.

(4) *Other modifications*.—The trunk circuit shown in FIG. 7 is used for a common control type automatic exchange, etc. using crossbar switches which utilize the same terminal for both originating and terminating calls and compared with the aforementioned it is very simplified. However, it has quite similar operations to those mentioned before, that is $B_5$ and $B'_5$ operate only at the time of originating calls; paths of cross-contacts for originating and terminating calls are different; in case of originating calls the holding magnet is held by slow-release of $B_5$ until ground comes from RT wire of the automatic exchange; a terminating call has priority over an originating call; two-party line discriminating relay $P_5$ enters into the speaking circuit only at the time of originating calls; it is similarly capable of separate suspension of originating calls, but, as shown in FIG. 9, if $B'_5$ is omitted by excluding the separate originating call suspending function, $P_5$ enters into the speaking circuit even in the case of terminating calls. Exchanges in the sendout direction of the ringing current are carried out by the speaking current feeding circuit of the automatic exchange, and no change is required in the connecting operation of the automatic exchange. In case the common relay is put on the line terminal side, and its operation is controlled by the common controlling device of the automatic exchange, then relay $P_5$ and contacts for $M_1$ and $M_2$ of the cross contacts shown in FIG. 9 are unnecessary, and the sendout direction of the ringing current is determined by operation or non-operation of the two-party relay of each subscriber line controlled by the automatic exchange. However, it is not so easy to separately suspend originating calls of a party-line subscriber. And in this case it is not possible to lessen the price of the exchange equipment as much as that of Step-by-Step Automatic Exchange, That is, the cost of the line concentrator will represent the increase in the equipment cost as it is, therefore, the actual saving in the exchange office will be the balance obtained by deducting the cost of the line concentrator from the amount saved in the line plant cost.

Figure 3:
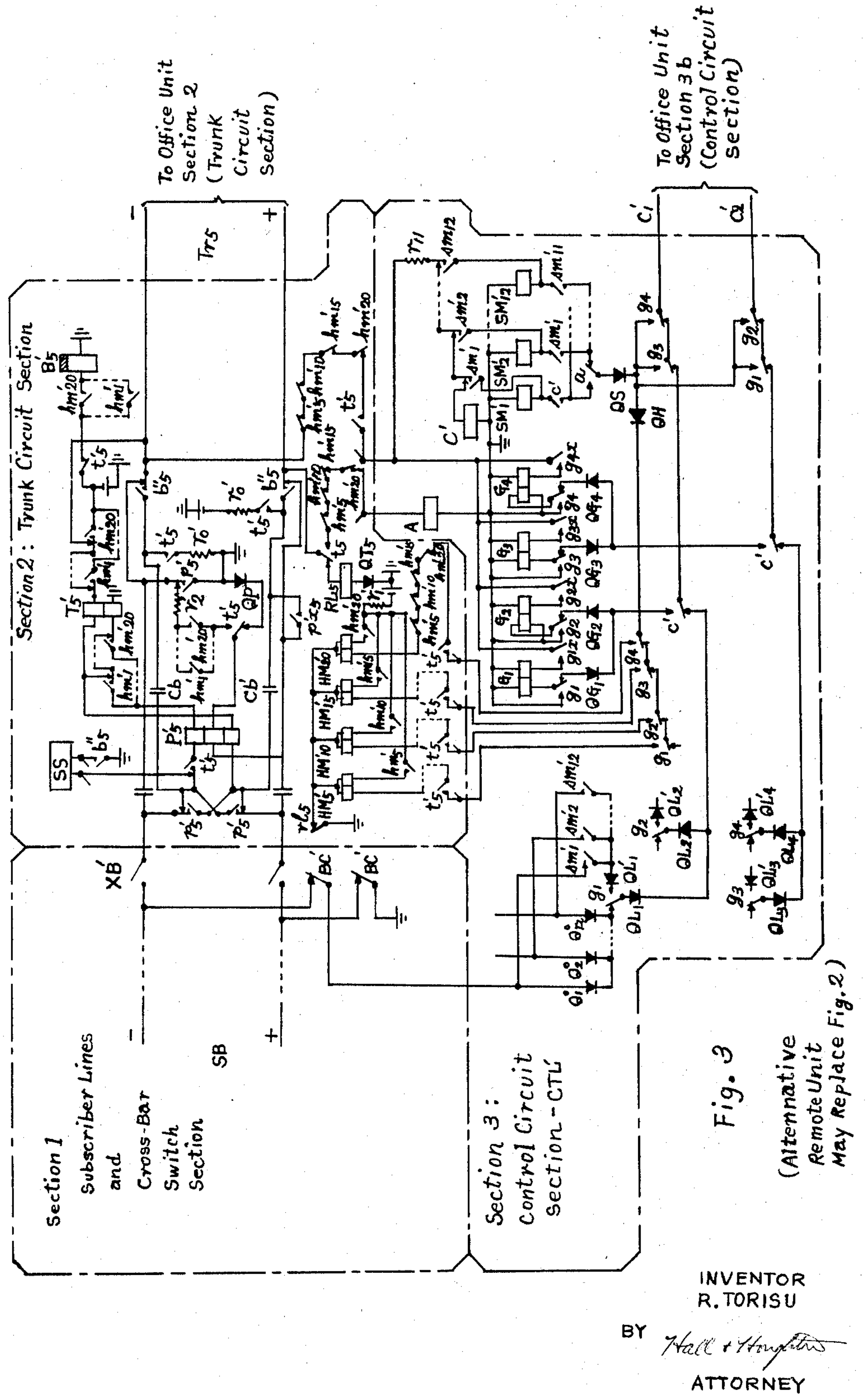
FIG. 3 shows a variation of the circuit diagram shown in FIG. 2 which has been changed so as to supply the speaking and ringing currents, to relay dial impulses, and to give the discriminating function of two-party subscription.

In FIG. 3 the speaking current and ringing current is supplied from the battery and ringing source in the remote unit of the line concentrator located in a place distant from the exchange office and which also relays the dial impulse as that this type is used for subscribers located a long distance from the exchange office. This equipment makes liaison with the exchange office plant entirely by means of a single line operation, therefore, compared with an ordinary line concentrator its use can be extended as far as about double the distance; its compensation for the current supply loss is achieved by the provided local power source; it makes the identification of a two-party line easy and the transmission of discriminating signals to and from the exchange office simple; relaying of the dial impulse is performed as a both lines impulse to ensure reliability; it needs only 4 relays in the trunk circuit; it involves almost no change in the common control circuit from that above described, and is rather simplified and stabilized in operation due to the use of relay $BL_5$ in place of a discharge tube $GL_5$. Details on these different points are given below.

(5) *Originating calls* (*via remote unit of FIG. 3*).—When connected to the calling subscriber $T'_5$ is put into operation through the subscriber loop to supply the speaking current and makes intermittent operation due to the dial impulse and by the first release $B''_5$ operates and remains in operation during a series of impulses. Impulse is sent over both lines to ensure operation via ground–$r'o$–$t'_5$–$b''_5$–(−) wire, and also via battery–$r'o$–$t'_5$–$b''_5$–(+) wire. Relay $P'_5$ operates for a party of a two-party line as described before, but as the distance from the line concentrator to the subscriber is very short, therefore, the grounded neutral system is enough. However, the operation is better if coupling through about 100 to 200 ohms is made between break contacts of the make before break earth contact placed in the telephone dial. When $P'_5$ operates once the (−) wire alone is grounded to cause $P_5$ in the exchange office side to be put into operation. When a holding magnet, for instance, $HM'_5$ operates once it sets up a holding circuit by the route of battery–$r'_1$–$hm'_5$–$rl_5$–ground, and opens its own operating circuit, that for other holding magnets used in the same trunk circuit, that of relay A, and the starting and holding circuit for the Order Selective Circuit, and the holding circuit for individual group relays as well. The loop for the exchange office side is set up via (−) wire–$b''_5$–$p'_5$–$r'_2$–$hm'_5$–$t'_5$–$P'_5$–$b''_5$–(+) wire, but in this loop $P'_5$ does not operate and acts as an impedance to enhance transmission efficiency during the conversation.

(6) *Terminating calls for FIG. 3.*—Trunk relay $T'_5$ releases when the trunk concerned is connected to the called subscriber, then $B''_5$ operates to cause signal source SS to start, and ringing is sent to the called subscriber, and also ring back tone is sent back to the calling subscriber through condenser $Cb$. When the called subscriber answers, $T'_5$ operates by the route of battery–$hm'_5$–$T'_5$–$P'_5$–$p'_5$–XB'–(+) wire . . . SB–subscriber–SB . . . (−) wire XB'–$p'_5$–$t'_5$–SS–$b''_5$–ground, and makes $P'_5$ inoperative. Condenser $Cb'$ is of the same capacity as $Cb$ and is for balancing the speaking circuit, but during relay of the dial impulses it acts on the impulse contacts to quench the sparks. To one party of a two-party line battery comes from the automatic exchange to (+) wire to operate relay $P'_5$ by the route of battery . . . (+) wire–●–$b''_5$–●–$P'_5$–$t'_5$–Q P–ground (with $px'_5$ bridging the two ● points)

therefore, the send-out direction of ringing to the called subscriber is reversed, and the wanted subscriber alone is called up. For a terminating call to the other co-subscriber battery from the automatic exchange is absent on (+) wire, therefore, relay $P_5$ will not operate.

(7) *Release for FIG. 3.*—When the calling subscriber hangs up his handset, $T'_5$ is released and $B''_5$ operates, but the loop on the exchange office side is opened, the holding magnet $H_5$ on the exchange office side is released, and while $K_5$ is releasing (+) battery of (−) 150 v. is sent through (+) wire, the relay $RL_5$ operates by the route of (+) battery or (−) 150 v. . . . (+) wire–$t'_5$–R $L_5$–●–Q $T_5$–●–ground and $HM'_5$ is released. Accordingly, $B''_5$ is also released. In the case of the called subscriber, even when the handset is hung up the exchange office side is opened, but ground is lost on the RT wire upon the calling subscriber's hanging his handset up, thus ending in a release the same as before.

Figures 12, 13, 14:
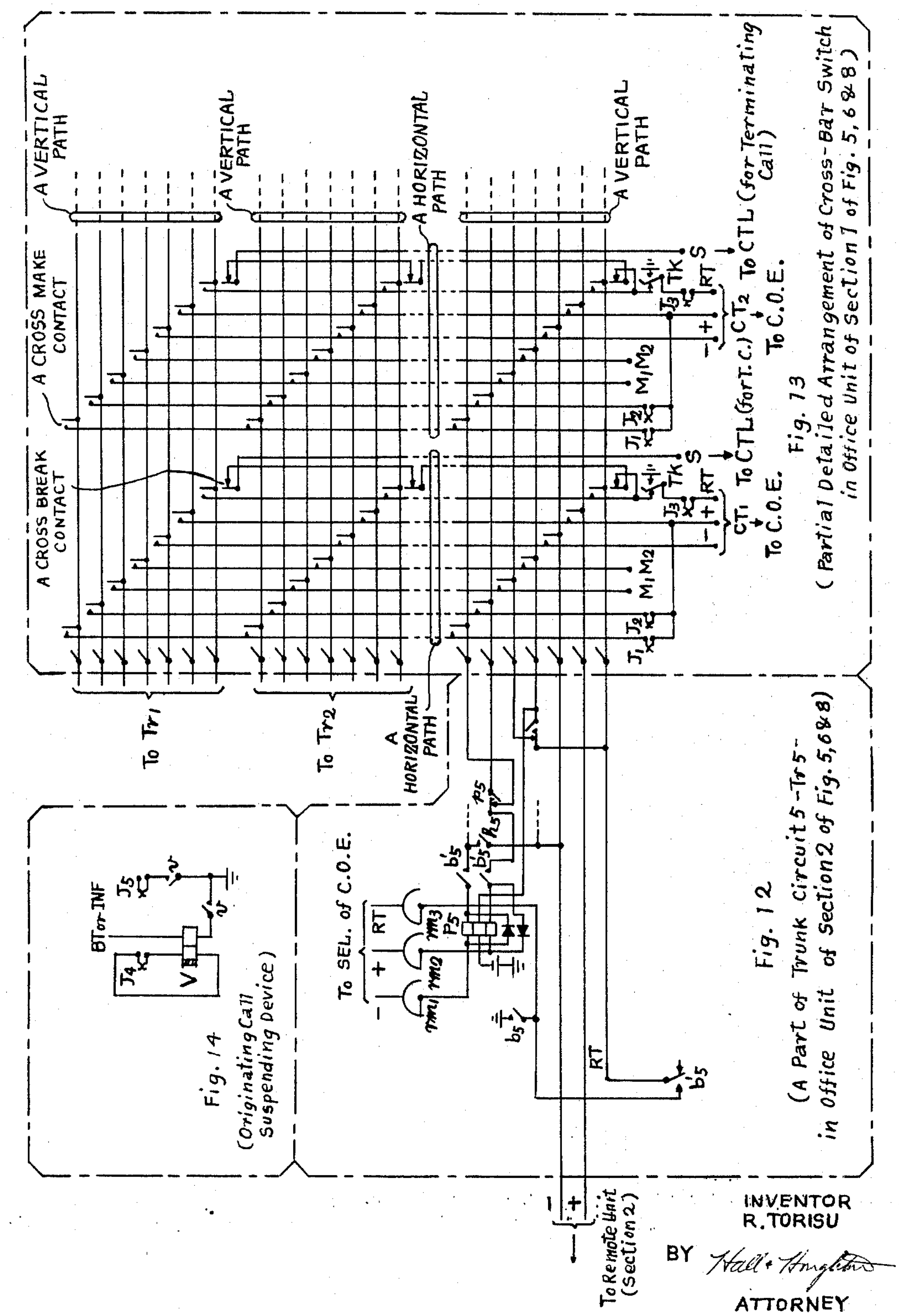
FIGS. 12, 13 and 14 are diagrams of portions of office unit circuitry for facilitating detailed description of separate originating call suspending function and the detail of a cross-bar switch.

(8) *Suspension of originating calls.*—The separate suspension of originating call which has been touched upon in the case of originating calls under heading (1) above will be described in detail. FIGURES 12 and 13 show detailedly a part of the trunk circuit of FIG. 6; FIG. 14 shows the originating call stop circuit which is inserted into the circuit of FIG. 6 or 13 (or into the circuit of FIG. 5 as hereinafter described) by plugging into the jacks $J_1$ and $J_3$ as will now be described. A duplex head plug connected with a pair of wires is inserted between jack $J_1$ (FIG. 6 or 13) and jack $J_4$ (FIG. 14) so as to insert the relay V in the circuit of jack $J_1$, and a duplex head plug of single line is inserted between jack $J_3$ (FIG. 6 or 13) and jack $J_5$ (FIG. 14). In the case of originating calls when the trunk $Tr_5$ is connected to selector SEL of the automatic exchange, the contacts $b'_5$ and $H_5$ are in the operating condition, so the high-resistance slow-release relay V enters into the (+) wire and V operates, but relay A of SEL cannot operate. Even if dial impulse is sent, V is not released and A will not operate. The ground is sent from jack $J_5$ to jack $J_3$, the RT wire of the line terminal $CT_1$ is grounded, therefore this trunk and this subscriber line are kept busy for the other call. To the calling subscriber is sent busy tone BT or information INF, that explains the reason why originating call is impossible by a tape-recorder. In this case of one of the two-party line subscribers, if the calling subscriber does not fall under the said explanation, the (−) wire of the subscriber line is grounded automatically at the beginning and the end of sending each dial impulse train, the two-party line discriminating relay $P_5$ of differential winding operates by its single winding together with relay A of the selector SEL making a holding circuit of relay $P_5$ by ground on the RT wire, relay V is released on being removed off the impulse circuit, and ground on the RT wire is sent from SEL so that a normal connection may be set up. In cases jack $J_2$ is used in place of jack $J_1$, when the holding magnet $H_5$ operates, the calling subscriber is extended to SEL; ground is sent from the RT wire of SEL before $B_5$ is released and a normal connection is immediately set up, but an originating call from a co-subscriber of the two-party line grounds either (−) wire or both wires automatically at the beginning and the end of sending each dial impulse train, and relay $P_5$ operates to retain and relay V operates, then relay A of SEL which operates by the loop of the calling subscriber is released by the first break contact of the dial impulse and after that even though A of SEL makes operation by single wire ground of dialling, this A relay releases again during the transmission of dial impulse due to the high resistance of V. The calling subscriber after hearing the busy tone or the information of originating call suspension will hang up his handset. Ground on the RT wire is, as is aforementioned, sent from jack $J_3$. In FIG. 12 the make contact of $H_5$ indicates $h_5$ alone of the parallel circuit composed of the four make contacts, $h_5$, $h_{10}$, $h_{15}$ and $h_{20}$. In the case of the circuit of FIG. 5, when relay V is inserted into jack $J_3$, A of SEL operates for the originating call suspended but, when dialled, it is released and this subscriber cannot be connected to, and BT tone, INF, are heard; other conditions are as aforementioned being similar to the foregoing explanation in case V is inserted into jack $J_2$.

Figure 8:
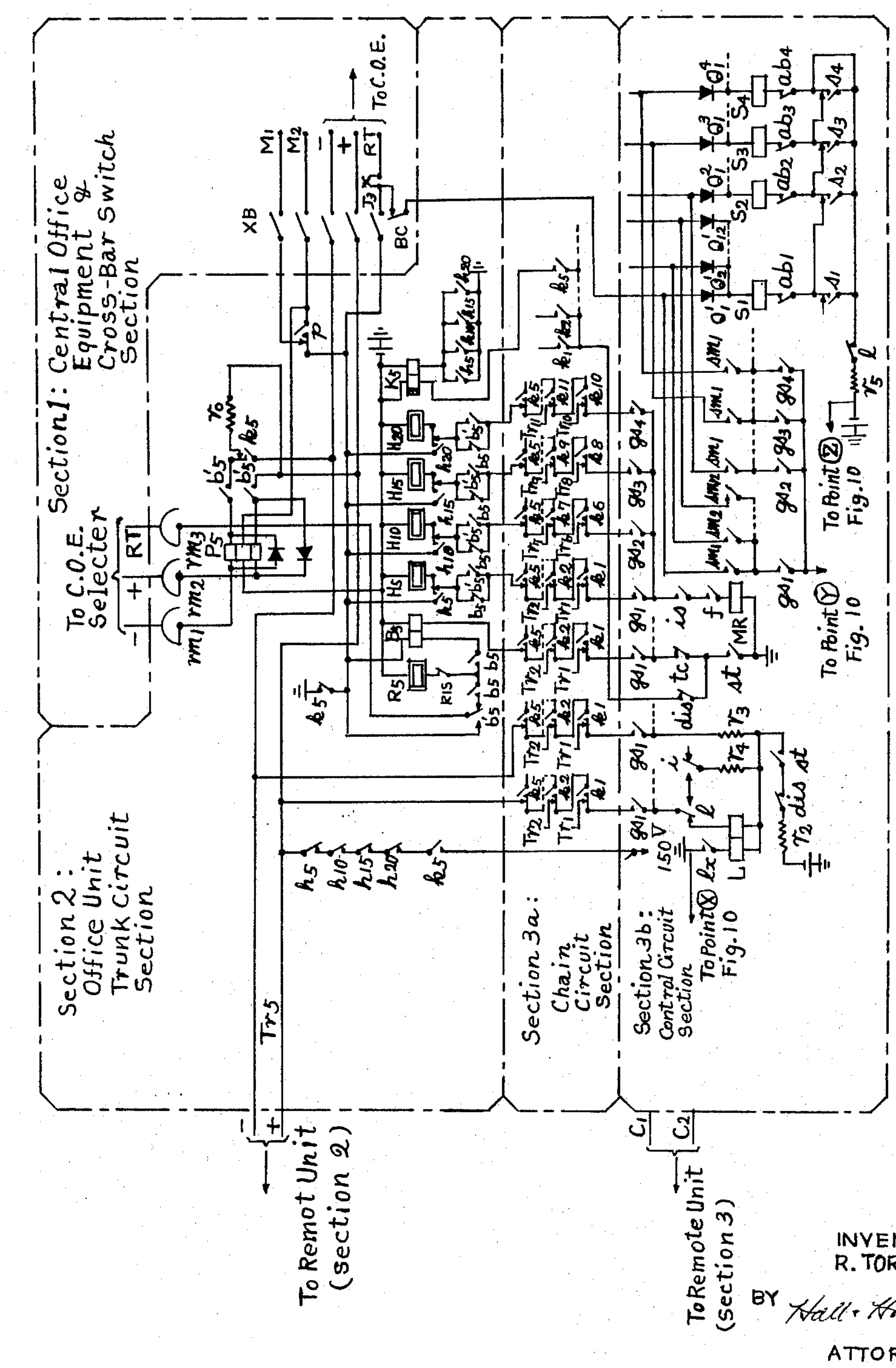

(9) *Others.*—FIG. 8 is the case wherein no origination suspension is carried out on the exchange office side; in this case, originating call discriminating relay $B_5$ has two-step operation; an idle line for the automatic exchange is hunted in the first step operation; it is stopped on the idle line in the second step; a temporary loop is set up for the automatic exchange with resistance $ro$; ground is sent from the automatic exchange to the RT wire; when holding magnet $H_5$ operates, trunk relay $K_5$ operates, and the loop for the automatic exchange is extended to the calling subscriber. The cross contacts of the crossbar switch will decrease by two, but if it is for individual line, the cross contacts for $M_1$ and $M_2$ are also unnecessary.

FIG. 10 shows the circuit for making a simultaneous test using AC power supply SG and rectifiers $QC_1$ . . . $QC_4$ in order to identify 2 groups by means of one control line $c_1$, and another 2 groups by means of the other control line $C_2$, that is, with the current in the same direction the common control lines $C_1$ and $C_2$ make test of one group each, and with that in the opposite direction $C_1$ and $C_2$ make test of another one group each. For SG may be employed a commercial frequency of such as 50–60 cycles, and this feature is advantageous in not requiring contacts when detecting four groups of subscribers with a pair of common control lines.

The present device having been provided with contact such as $x_1$, $x_2$, it is also possible to detect four groups of subscribers when these contacts are employed either in the case of FIG. 10 and FIG. 11, even though no AC current is used, although there seems to be a question, though minor, in maintenance since there run chargings and leaks, thereby wearing the contact $x_1$ or $x_2$, even if the calling subscriber does not lift up his handset. But it is very exact in operation. In FIGS. 10 and 11, the arrangement is such that when trunks of groups 1 and 2 are all occupied $AB_1$ is made operating; the group relay circuit is opened; a busy tone is sent by $C_1$; when trunks of groups 3 and 4 are all occupied, $AB_2$ operates; the group relay circuit is opened; and a busy tone is sent out through $C_2$, but it can be so arranged that, by providing $AB_1$, $AB_2$, $AB_3$, and $AB_4$ and by using two kinds of busy tones of different intermittent numbers, the one group relay is cut off and a busy tone is sent out to the subscribers thereof if and when the trunks belonging to one group are all occupied. If it is the case of only two groups into which the crossbar switch is divided, it will be so arranged that the (−) battery is connected to either $Go_1$ or $Go_3$ directly or the (+) battery is connected to either $Go_2$ or $Go_4$ directly, and $S_1$ to $S_4$, $GS_1$ to $GS_4$ and $G_1$ to $G_4$ are respectively reduced to 2. The crossbar switch used in the present invention is provided with a break contact at the cross contact and is so composed that the break contact for the subscriber lines will operate by the operation of a holding magnet, so that this is very reliable as well as very small in size. This type of cross-bar switch, but not the dividing thereof, is disclosed for example in the U.S. patent to Torisu issued Nov. 22, 1960, No. 2,961,493.

(10) As the foregoing explains, the present invention is applicable as a line concentrator for any automatic exchange, the circuit being simple, the operation being reliable and the equipment small-sized, and the range of usage being wide i.e. from small capacity to large capacity. Since a remote unit can be installed at a point considerably distant from the office, it is possible to render exchange service by concentrating circumferential small offices to which individual toll rates are applicable in one exchange office, which is extremely advantageous in maintenance as well as from the standpoint of management. Particularly, in the step-by-step type automatic exchange, there will be almost no increase of the total expenditure for the line concentrator and the automatic exchange equipments from which are eliminated line relays, cut off relays, line finders (or line switches) and some part of the main distributing frame, etc., due to using the line concentrator. An outstanding feature of this invention is that the required number of trunks is freely and easily changeable according to the call volume of subscribers. The system also is convenient in the billing of charges since it enables that two-party lines to be discriminated with only one relay, separate call registrations to be performed, and separate suspensions of origination, all being done within the exchange office.

What I claim is:

1. A telephone line concentrating system comprising:

(A) an office unit and a remote unit of a line concentrator;

(B) a central office including an automatic exchange equipment associated with said office unit;

(C) a plurality of subscribers lines associated with said remote unit and a plurality of subscribers line terminals corresponding to said subscribers lines and associated with said office unit;

(D) a plurality of trunk lines interconnecting said remote and office units, said trunk lines being less in number than the number of said subscribers lines; and (E) calling signal responsive means for causing, through selected ones of said trunk lines, calling and called ones of said subscribers lines to be connected to and disconnected from the corresponding subscribers terminals at said office unit and to be connected to and disconnected from said automatic exchange equipment, said means comprising:

(1) a plurality of common control lines interconnecting said units, said control lines being less in number than said plurality of trunk lines;

(2) at said remote unit, cross-bar switch means for interconnecting said subscribers lines and said trunk lines, said cross-bar switch means comprising (a) a plurality of vertical paths divided into at least two groups, each group including a plurality of vertical paths, said cross-bar switch means further comprising (b) a separate group of horizontal paths associated with each group of vertical paths, each group of horizontal paths including a plurality of such paths and said horizontal paths being individually directly connected to said subscriber lines;

(2′) at said remote unit, at least one of the vertical paths of each group being connected in multiple to one of the vertical paths in another of said vertical groups to constitute a vertical path set, and at least one of the vertical paths of each of said groups being free of interconnection with vertical paths of any other group and itself individually constituting a vertical path set; and (2″) at said remote unit, a number of trunk circuits, each connected to one of said trunk lines, and connected respectively, one to each of said vertical path sets;

(3) at said office unit, cross-bar switch means for interconnecting said trunk lines with said subscriber line terminals, said crossbar switch means comprising groups of vertical and horizontal paths corresponding to those at said remote unit, with said subscriber's line terminals directly connected to the horizontal paths at said office unit in correspondence with the connections of the subscribers lines at the remote unit;

(3′) at said office unit, the vertical paths of said groups being connected in sets corresponding to those at the remote unit;

(3″) at said office unit, a number of trunk circuits corresponding to those at the remote unit and connected at said office unit in correspondence with the connections of the trunk circuits at the remote unit; and (4) at said remote and office units, common control circuit means connected to said control lines and said cross-bar switch means and responsive to subscribers line and terminal identifying signals passed thereto from said subscriber lines and from said automatic exchange equipment for determining the groups of horizontal and vertical paths with which the signal identified subscriber line and terminal are associated, for selecting one of the paths of the so determined group of vertical paths that is connected to a non-busy trunk line in accordance with a predetermined operating order, for operating said cross-bar switches to interconnect the so identified subscriber line and terminal through the so selected trunk line, for applying a hold to the circuit thus established, and for disconnecting the circuit thus established from said common control circuit means, (5) the cross contacts of said cross-bar switches including normally closed contacts as well as normally open contacts, and said signal responsive means being put into operation by a signal passed thereto from a calling subscriber's loop via the circuit afforded by said normally closed contacts pending operation of said cross-bar switches.

2. A telephone line concentrating system according to claim 1, wherein said signal responsive means (4) comprises a trunk relay associated with each of said trunk circuits and a chain circuit means of said office unit comprising contacts of the trunk relays thereat for determining the operating order of the trunk circuits of each of said groups.

3. A telephone line concentrating system according to claim 1, wherein said signal responsive means comprises, at said office unit, a rotary switch means associated with each of said trunk line circuits ahead of its connection to the subscriber line terminals at said office unit, said rotary switch means being operatble for connecting said trunk circuit to a selector of said automatic exchange equipment.

4. A telephone line concentrating system according to claim 1, said cross-bar switches having selecting magnets for the horizontal paths therein and holding magnets for the vertical paths therein, and wherein the order selectin circuit of said signal responsive means (4) comprises the selecting magnets of said cross-bar switches.

5. A telephone line concentrating system according to claim 1, wherein the system at said office unit comprises a two-party relay for making service discriminations between the parties of a two-party subscriber line, and wherein said two-party relay is connected to one of said trunk circuits between said trunk lines and the cross-bar switch at said office unit.

6. A telephone line concentrating system according to claim 5, wherein the equipment at the office unit comprises means for suspending origination of calls, and means for connecting such call suspending means into the horizontal path at the cross-bar switch which is connected to the subscriber terminal for which origination of calls is to be suspended.

7. A telephone line concentrating system according to claim 6, wherein said call suspending means is associated with a two-party line terminal of said cross-bar switch and is connected to be rendered operative or inoperative in accordance with the position of said two-party relay.

References Cited

UNITED STATES PATENTS

| | | | |
|---|---|---|---|
| 2,358,095 | 9/1944 | Parker | 335—112 |
| 2,362,551 | 11/1944 | Harrison | 355—113 |
| 2,850,577 | 9/1958 | Krom et al. | 179—18.3 |
| 2,921,139 | 1/1960 | Krom | 179—18.3 |
| 3,190,968 | 6/1965 | Krom | 179—18.3 |
| 3,022,382 | 2/1962 | Ewin | 179—18.3 |
| 3,217,107 | 11/1965 | Schorum | 179—18.3 |

KATHLEEN H. CLAFFY, *Primary Examiner.*

LAURENCE WRIGHT, *Examiner.*